US010579618B1

(12) United States Patent
Strahan

(10) Patent No.: US 10,579,618 B1
(45) Date of Patent: Mar. 3, 2020

(54) QUERY ROUTING AND REWRITING

(71) Applicant: Amazon Technologies, Inc., Seattle, WA (US)

(72) Inventor: Robert Strahan, Herndon, VA (US)

(73) Assignee: Amazon Technologies, Inc., Seattle, WA (US)

( * ) Notice: Subject to any disclaimer, the term of this patent is extended or adjusted under 35 U.S.C. 154(b) by 305 days.

(21) Appl. No.: 15/083,087

(22) Filed: Mar. 28, 2016

Related U.S. Application Data

(60) Provisional application No. 62/267,821, filed on Dec. 15, 2015.

(51) Int. Cl.
G06F 16/00 (2019.01)
G06F 16/2453 (2019.01)
G06F 16/248 (2019.01)

(52) U.S. Cl.
CPC ...... *G06F 16/24534* (2019.01); *G06F 16/248* (2019.01)

(58) Field of Classification Search
CPC ............ G06F 17/3097; G06F 17/3053; G06F 17/30035; G06F 16/24534; G06F 16/248; G06F 16/9535; G06F 16/00; G06F 30/08; G06F 17/30867; G06F 17/30554; G06F 17/30; G06F 16/236; G06F 16/213; G06F 16/84; G06F 16/9027; G06Q 30/0631; G06Q 30/0633; G06Q 30/0623

See application file for complete search history.

(56) References Cited

U.S. PATENT DOCUMENTS

| 6,631,371 | B1 | 10/2003 | Lei et al. |
| 7,698,479 | B2 | 4/2010 | Georgalas et al. |
| 7,831,693 | B2* | 11/2010 | Lai .......... G06Q 10/10 706/27 |
| 8,069,435 | B1* | 11/2011 | Lai .......... G06Q 10/10 717/106 |
| 8,346,929 | B1* | 1/2013 | Lai .......... G06Q 10/10 709/226 |
| 8,386,540 | B1* | 2/2013 | McAlister ............ G06F 16/256 707/899 |
| 8,396,929 | B2* | 3/2013 | Helfman ............... H04L 67/327 707/693 |
| 8,706,715 | B2* | 4/2014 | Eidson ............. G06F 17/30463 707/714 |
| 9,147,007 | B2* | 9/2015 | Kanawa ............. G06F 16/8358 |
| 9,659,040 | B1* | 5/2017 | Bellingan ............ G06F 16/211 |
| 9,910,902 | B1* | 3/2018 | Kramer ............... G06F 16/2272 |
| 2001/0054020 | A1* | 12/2001 | Barth ...................... G06Q 10/02 705/37 |
| 2005/0044197 | A1* | 2/2005 | Lai ........................ G06Q 10/10 709/223 |
| 2005/0216498 | A1 | 9/2005 | Georgalas et al. |

(Continued)

Primary Examiner — Anh Ly
(74) Attorney, Agent, or Firm — Davis Wright Tremaine LLP

(57) ABSTRACT

A data warehouse system may include a connection pool manager. The connection pool manager may invoke a first client-provided function for rerouting a connection request from a first database to a second database based on a query that is to be executed using the connection. The connection pool manager may invoke a second client-provided function for rewriting the query to be executed to leverage database aspects found on the second database.

20 Claims, 11 Drawing Sheets

(56) References Cited

U.S. PATENT DOCUMENTS

| | | |
|---|---|---|
| 2008/0155641 A1 | 6/2008 | Beavin et al. |
| 2011/0055231 A1 | 3/2011 | Huck et al. |
| 2011/0082854 A1* | 4/2011 | Eidson .............. G06F 17/30463 707/714 |
| 2012/0166483 A1 | 6/2012 | Choudhary et al. |
| 2012/0173759 A1* | 7/2012 | Agarwal ............. H04L 67/2814 709/241 |
| 2013/0073744 A1* | 3/2013 | Ratica ................... G06F 9/4451 709/240 |
| 2013/0091170 A1* | 4/2013 | Zhang .............. G06Q 10/06313 707/783 |
| 2013/0304796 A1* | 11/2013 | Jackowski .............. H04L 47/19 709/202 |
| 2014/0250061 A1* | 9/2014 | Zoltan ............... G06F 17/30864 707/615 |
| 2014/0280032 A1* | 9/2014 | Kornacker ........ G06F 16/24544 707/718 |
| 2015/0186490 A1* | 7/2015 | Denuit .............. G06F 17/30584 707/634 |
| 2016/0117357 A1* | 4/2016 | Colrain ................ G06F 9/5027 707/703 |

* cited by examiner rewrite function
460

```
import re
def rewrite_query(username, query):
    q1="SELECT storename, SUM\(total\)
        FROM sales JOIN store
        USING \(storeid\)
        GROUP BY storename ORDER BY storename"
    q2="SELECT prodname, SUM\(total\)
        FROM sales JOIN product
        USING \(productid\)
        GROUP BY prodname ORDER BY prodname"
    if re.match(q1, query):
        new_query =
            "SELECT storename, SUM(total)
            FROM store_sales
            GROUP BY storename ORDER BY storename;"
    elif re.match(q2, query):
        new_query = "SELECT prodname, SUM(total)
                    FROM product_sales
                    GROUP BY prodname ORDER BY prodname;"
    else:
        new_query = query
    return new_query
```

FIG. 4B

QUERY ROUTING AND REWRITING

CROSS-REFERENCE TO RELATED APPLICATIONS

This application claims the priority benefit of U.S. Provisional Application No. 62/267,821, filed Dec. 15, 2015. The disclosure of which is incorporated herein by reference.

BACKGROUND

Distributed database management systems may include a number of databases which collectively manage a collection of data. The collection may, for example, comprise a table which for various reasons, such as space or processing efficiency, has been split into multiple partitions, wherein each partition is maintained by at least one of the databases. In some cases, a given partition may be replicated across multiple databases so that queries pertaining to a particular partition may be processed by one of the replicated databases.

In some cases, a database may maintain a partition using a different structure than is employed by other partitions. For example, a database maintaining a first partition may use a local index pertaining only to that partition, and which may not exist for other partitions, or for replicas of partitions.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

FIG. 4B is a diagram depicting an example of a rewrite function.

DETAILED DESCRIPTION

Figure 1:
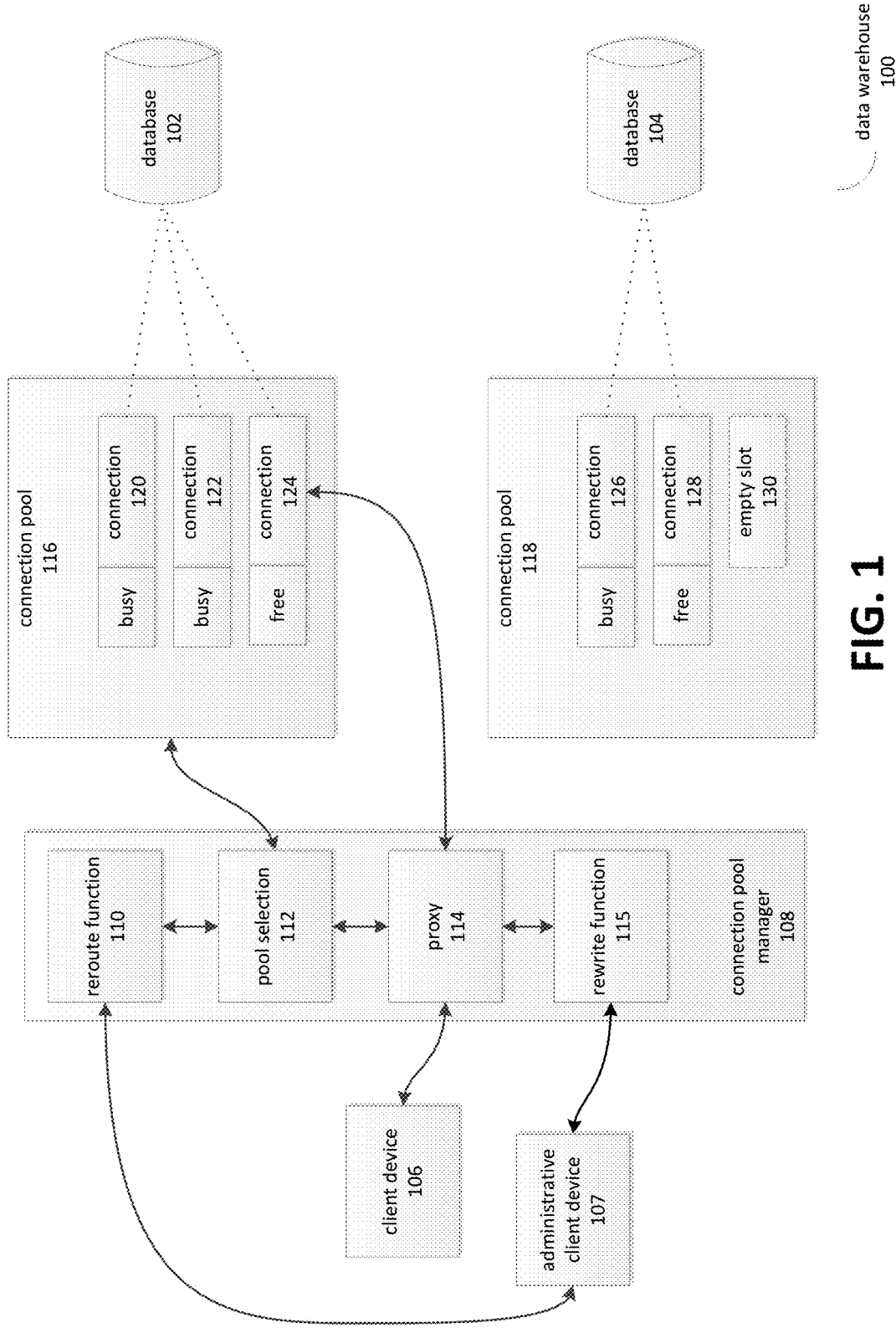
FIG. 1 is a block diagram depicting a data warehouse including a connection pool manager with rerouting and rewriting functions.

Disclosed herein are systems, methods, and computer program products pertaining to the management of database connections and queries. The disclosed systems, methods, and computer program products further pertain to rerouting database connection requests and rewriting database queries using rerouting and rewriting functions. The rerouting and rewriting functions may be supplied by a client device, the client device being used, in some instances, as a mechanism for administrating consumer of database or data warehouse services. The supplied functions may define application-specific instructions for rerouting database connections and rewriting queries.

In an example embodiment, a client device accesses a table maintained in a data warehouse. The client device may, for example, insert data into the table and retrieve data from it. Within the data warehouse, the table may be maintained in whole or in part on a number of database systems. For example, a table might be horizontally partitioned, vertically partitioned, or replicated. In some instances, structures such as indices and column-oriented storage might be employed on one of the database systems, while an alternative structure is employed on another. The variance in structure between the databases may improve query efficiency for certain queries. For example, a first database might maintain table $T_1$ and a related index IDX1 over a column $C_1$, while a second database might maintain a replica of table $T_1$ without the index. In this case, a query that includes a WHERE clause referencing column $C_1$ might be processed more efficiently on the first database, where the index is available, than on the second database, where the index is not available.

The client device may access the table using a connection pooling manager. Connection pooling may refer to techniques associated with connecting to a database. The techniques involve maintaining a pool, or collection, of open connections to a database. When a client using a connection pooling mechanism requests a connection to the database, the open connection may be withdrawn from the pool. When the client is done using the connection, it may release the connection which may then be returned to the pool rather than being closed. Typically, each pool of connections is associated with a particular database. In some cases, pools may be further subdivided based on other properties of the connection, such as the user credentials on which access to the table is based.

A connection pooling mechanism may also include a database proxy. The proxy may act as an interposing agent in various communications with a database, such as connection requests, query transmissions, and so forth. The proxy may receive these communications from a client device, perform additional processing as described herein, and forward the communications to the database.

A rerouting function may be supplied to the connection pooling manager. The rerouting function may, for example, be supplied by an administrative client device and may be adapted to an application function performed by a client device that accesses a database in the data warehouse. The rerouting function may cause connection requests, queries, and other communications with a database to be rerouted to another database. The rerouting function may be used, for example, as a mechanism for performing load balancing based on the contents of a query and other information. For example, queries directed to a table T1 might be directed to database D1 if they specify a where clause that restricts the results to a single row, and to a second database D2 if they do not contain a where clause.

A rewriting function may be supplied to the connection pooling manager to alter queries. The rewriting function may be adapted to an application function performed by a client device. The rewriting function may programmatically change queries sent by the client before they are processed by a database. For example, a logical table might be partitioned into a number of physical tables based on date. A rewriting function might alter a query of the logical table to specify a physical table based on a date range specified in the contents of the query's where clause.

The rerouting and rewriting functions may also be used in combination. For example, a routing function might direct a connection request to a specific database, and a rewriting function might rewrite queries to take advantage of structures localized to the specific database.

In some cases and in various embodiments, the first database may be a stand-in for a collection of databases to which connections are always rerouted. For example, a database name such as "DB" might be used to represent the first database, even though no database named "DB" exists. Instead, all connections might be routed to database "DB1" and "DB2," for example. As used herein, the term "logical database" refers to a database that can be either an operative database to which a connection may be made, or to a representation of a non-operative (i.e. non-existent or virtual) database. Similarly, the term logical table may refer to an operative table or to a table that is representative of one or more other operative tables but is not itself operative. Typically, a reference to a logical table may be corrected using query rewriting, as described herein.

In an example, a distributed database management system may comprise a first logical database comprising a first logical table and a second database comprising a second table. The system may further comprise a computing node that implements a connection pooling and/or database proxy mechanism. The computing node may receive, from a client device, one or more requests that are collectively indicative of connecting the client device to the first database and processing a first query on the first logical table. For example, the one or more requests may comprise a first request to connect to the first database, and a second request to execute the first query using the connection to the first database. The computing node may cause a connection to be made to the second database in place of a connection to the first database. This may be in response to a determination to connect to the second database that is based, at least in part, one the result of invoking a first function. The first function may comprise instructions for analyzing the first query. The computing node may further obtain a second query, based on the first query, by applying a second function to the first query. The second function may comprise instructions for rewriting the first query so as to adapt it to a difference between the first and second table. The computing node may then send a request to process the second query to the second database and send the results processing the second query to the client device.

In an example, a method may comprise receiving one or more requests that are collectively indicative of connecting a client device to a first database and processing a query involving the first database. The method may further involve connecting the client to a second database. The connection may be in response to a determination to connect the client to the second database instead of the first database, based at least in part a result of invoking a first function that comprises executable instructions for analyzing the query. The method may further comprise sending the request to process a version of the query to the second database, and sending the results of processing the version of the query to the client device. The version of the query that is executed may be the original first query or a second query. The new query may be formed, for example, by applying a second function to the original first query, whereby the first query is rewritten to form the second query.

In some instances, connections may be rerouted to a database because of the capacity, or more generally the ability, of the database to which the connection is rerouted. Capacity and ability may refer to a variety of factors, such as the optimization structures (such as indexes) of the database, the partitioning scheme, amounts of computing resources that a customer is authorized to use, the current workload of the database, and so on. Capacity and ability may also refer to these aspects analyzed with respect to a particular query. For example, a particular database might have greater capacity or ability to process a query than another database based on the particular attributes of the query. One example is column-centric queries. A database that employs columnar storage might have better capacity or ability to process a column-centric query than a database that employs row-oriented storage.

FIG. 1 is a block diagram depicting a data warehouse including a connection pool manager with rerouting and rewriting functions. A data warehouse 100 may be a distributed system included a plurality of databases 102, 104. In some instances, the database 102, 104 may share schema elements. For example, a table in one database 102 might be replicated in another database 104.

A connection pool manager 108 may maintain connection pools 116, 118. A connection pool 116 may comprise a collection of active (though not necessarily in-use) connections to a database. Typically, connecting to a database comprises operations such as validating credentials and opening a communications channel between the client and server. As these operations may take some time, it may be efficient to hold active but unused connections in a connection pool 116 until they are needed. For example, the connection pool 116 might contain a number of connections 120-124 for which credentials have been verified and a communication channel opened to a database 102. As depicted by FIG. 1, at a given time some number of the connections 120-124 may be busy or free. Here, a free connection 124 is available to be assigned to an application that requests a connection to a database. Busy, similarly, means a connection 120, 122 that is currently being used by an application. When the application is done using the connection, the connection may be made available for use at a later time.

A connection pool 118 may also grow or shrink over time. The connection pool 118 might, for example, have a maximum capacity of connections. As additional connections are needed, they may be created and added to the connection pool 118 as needed. For example, the connection pool might initially contain two connections 126, 128. One of the connections 126 might be busy while the other connection 128 is free. The existing free connection 128 could be assigned to the next application to request a connection to a database. If another request for a connection is received before either busy connection 126, 128 has been released back to the pool, an empty slot 130 in the collection might be filled with a newly created and activated connection.

An administrative client device 107 may provide a reroute function 110 and/or a rewrite function 115 to the connection pool manager 108. The functions may, for example, comprise source code instructions for performing connection rerouting and query rewriting. In an embodiment, the functions 110, 115 may be written in the PYTHON programming language. In another embodiment, the functions 110, 115 may be supplied as a compiled executable library comprising one or more functions corresponding to a standardized interface for reroute and/or rewrite functions. In some instances, the reroute and rewrite functions 110, 115 may accept a query string and a user identifier as input parameters.

In some instances, the administrative client device 107 may be associated with, or the same as, the client device 106. For example, an application might interface with the connection pool manager 108 to provide reroute function 110 and rewrite function 115. In other instances, the administrative client device 107 may be a separate device. For example, a computing device might comprise computer-executable instructions for providing an administrative interface to the connection pool manager 108. The functions of the administrative interface might include functions for submitting the reroute function 110 and rewrite function 115.

The connection pool manager 108 may comprise a pool section module 112. The pool selection module 112 may coordinate selection of a pool of connections appropriately matched to the requirements of a connection requested for a client device 106. The client device 106 might request a connection having various properties. The properties might, for example, comprise the name of the database to which a connection is requested, the security credentials, and a packet size for network communication. In FIG. 1, a first connection pool 116 might correspond to a set of connections each having the same set of these properties, while a second connection pool 118 might correspond to a set of connections each having some other set of properties. FIG. 1 depicts that at least one distinct property between the two depicted connection pools is that of the associated database. The connection pool 116, for example, contains connections to to a first database 102 while the second connection pool 118 contains connections to a second database 104.

When the client device 106 requests a connection, the pool selection module 112 may utilize the reroute function 110 to identify a connection pool from which a connection may be obtained. In some instances, the reroute function may accept query text as input and return an identifier of a connection pool as output. In some instances, the pool selection module 112 may provide the reroute function 110 with a list of candidate connection pools with appropriate identifiers. This information may also be exposed through an application programming interface provided to the reroute function 110. The reroute function 110 may execute and return an identifier corresponding to a connection pool. The returned identifier, for example, may correspond to a pool of connections for a database instance that is tuned for efficiency with respect to a query supplied to the reroute function 110 as input. The pool selection module 112 may then identify a free connection 124 from the identified connection pool 116 and return a reference to the connection 124 to the client device 106. The reference may, as depicted in FIG. 1, be to a proxy 114 for the connection 124. When the client subsequently interacts with the database 102, the operations may be performed using the proxy 114 as an intermediary.

The administrative client device 107 may also supply a rewrite function 115 to the connection pool manager. The rewrite function 115 may be invoked by the proxy in response to communications between the client device 106 and the database 102, via the proxy 114. For example, the client device 106 might transmit a request to process a query to the database 102. The proxy 114 may be interposed in the transmission of this request. The proxy 114 may identify the query in the request and provide it as a parameter to the rewrite function 115. The rewrite function 115 may then analyze the query and return a rewritten version of it to the proxy 114. The proxy 114 may then forward the request to database 102 using the rewritten query.

Although FIG. 1 depicts aspects of the invention performed by a connection pool manager 108, there are alternative embodiments of the present disclosure which may not include a connection pool manager. For example, in one embodiment, a proxy management module performs various operations attributed to the connection pool manager 108 in FIG. 1, except those pertaining to connection pools. For example, a proxy management module might receive reroute and query functions and apply them in the same manner as described herein. In some instances, rather than rerouting to a pool of connections from which a desired connection may be drawn, the proxy management module might reroute to a specific connection. The reroute function, in this case, may return information identifying a connection rather than a pool of connections.

Figure 2:
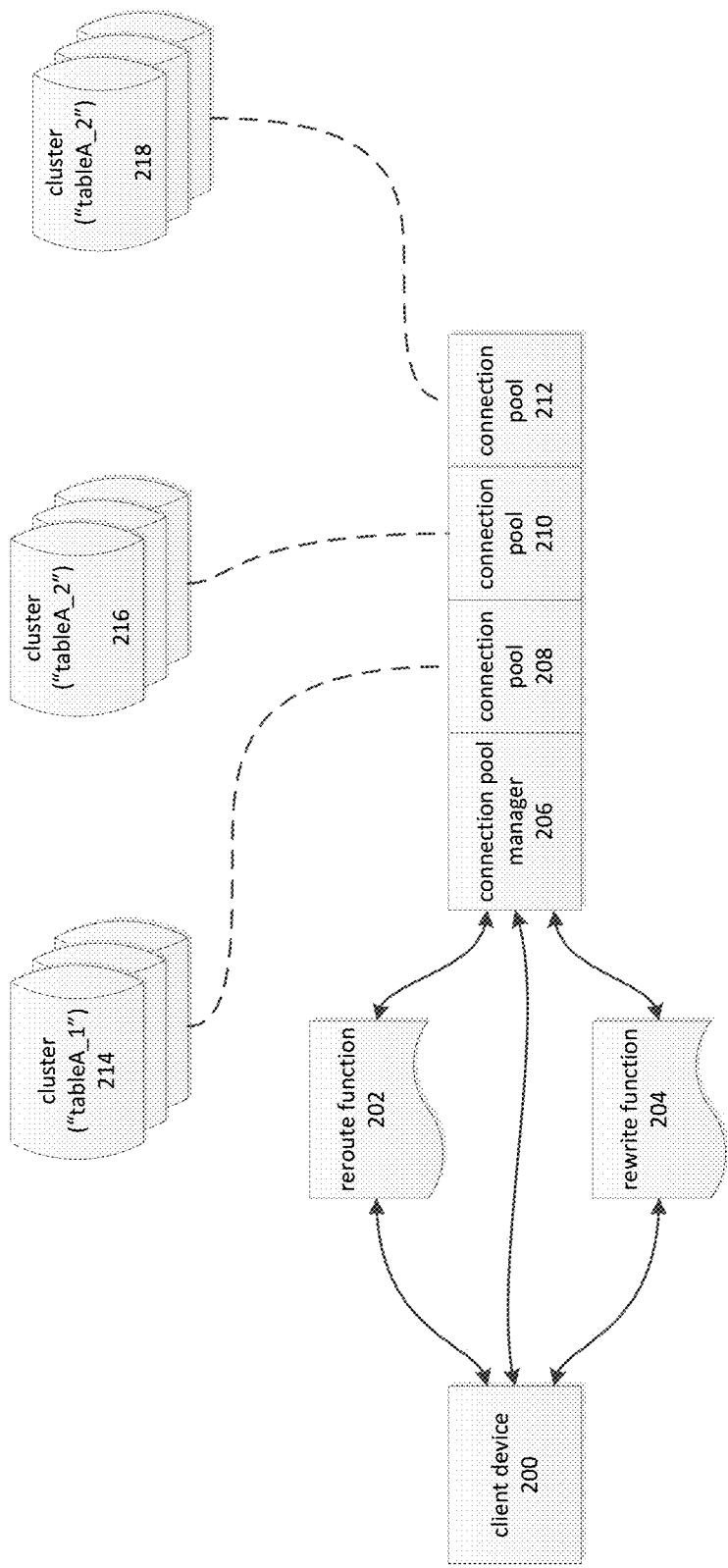
FIG. 2 is a block diagram depicting a system comprising a connection pool manager with rerouting and rewriting functions.

FIG. 2 is a block diagram depicting a system comprising a connection pool manager with rerouting and rewriting functions. A client device 200 may transmit a reroute function 202 and a rewrite function 204 to a connection pool manager 206. Each of the connection pools 208-212 may correspond to a database cluster 214-218. For example, the connections in a first connection pool 208 might correspond to databases in a first cluster 214, the connections in a second connection pool 210 might correspond to databases in a second cluster 216, and connections in a third connection pool 212 might correspond to databases in a third cluster 218.

Each of the clusters 214-218 may correspond to a particular table. Each of the databases in a cluster may be associated with a particular table, view, index, or other database object. For example, in FIG. 2 the databases that make up the first cluster 214 might all maintain a replicated version of "tableA_1." Similar, the databases that make up the second cluster 216 might all maintain a replicated version of "tableA_2," and the databases that make up the third cluster 218 might all maintain a replicated version of "tableA_3."

The reroute function 202 may be invoked by the connection pool manager 206. When invoked, the reroute function 202 may cause the connection pool manager 206 to reroute a requests for a database connection to a database within one of the clusters 214-218. In some instances, the rerouting may also comprise selection of a database within one of the clusters 214-218. For example, a connection request may be first rerouted to the cluster 216 for access the tableA_2, and then to a specific database within the cluster 216 for load balancing between the replicated versions. In cases where the instances of tableA_2 are replicated within cluster 216, the database within cluster 216 might be selected based on a round-robin algorithm. In some instances, some of the database in cluster 216 might be selected, based on a query associated with the connection request, based on whether the query involved an insert or update to the table, or if it was read-only.

The rewrite function 204 may be invoked by the connection pool manager 206. When invoked, the rewrite function 204 may cause a query, including those queries associated with a connection request processed by reroute function 202, to be rewritten prior to being sent to a database within cluster 214-218.

The reroute function 202 and the rewrite function 204 may write to a commonly accessible memory location in order to share information. For example, the reroute function 202 might store, in the commonly accessible memory location, information indicating what of the clusters 214-218 were selected and/or which database within the cluster was selected.

Note that in some instances, the specific databases within the clusters 214-218 may be transparently selected by the cluster itself, rather than by the operation of the reroute function 202 and the connection pool manager 206. In such cases, the reroute function 202 and the connection pool manager 206 may select one of clusters 214-218 to be associated with the connection, without identifying a specific database within the selected cluster.

Figure 3:
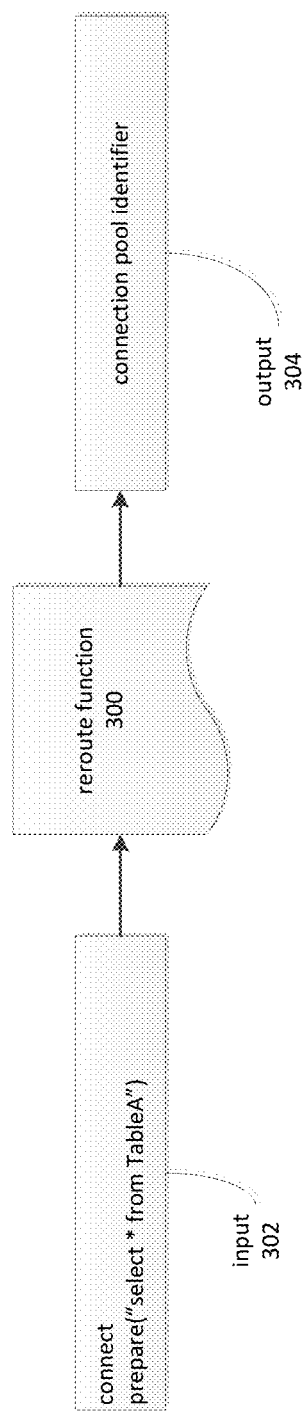
FIG. 3 is a block diagram depicting operation of a reroute function.

FIG. 3 is a block diagram depicting operation of a reroute function. A reroute function 300 may accept input 302 and return output 304. The reroute function 300 may, in some instances, be supplied in source code. The source code may, for example, comprise PYTHON, PERL, JAVASCRIPT, or other programming language instructions. The source code may conform to a template or other pattern selected for compatibility with a connection pool manager. For example, the source code may follow a naming convention, parameter-passing convention, and so forth.

In some instances, the reroute function 300 may be supplied as compiled executable or intermediate instructions. For example, the reroute function 300 might be supplied as a dynamically linked library comprising computer-executable instructions, or intermediate instructions that have been compiled for a virtual execution engine. The compiled instructions may conform to an interface selected for compatibility with a connection pool manager.

In some cases, the input 302 to reroute function 300 may include data that specifies a set of properties associated with a connection, such as the database to which a client device intends to connect. The reroute function 300 may act, with a connection pool manager, to reroute the connection request to a different database. Although an administrative client device might provide the reroute function 300 to the connection pool manager, the rerouting of the connection may otherwise be transparent to the client device.

The input 302 to the reroute function 300 may include data specifying a query that the client device is, or intends to, perform using the requested connection. In some instances, the query may not be available when the request for the connection is made. In such cases, the reroute function 300 may be invoked without including query information. The reroute function 300 might, for example, determine that no query information has been supplied to it and may, in response, return information indicating that a default database should be used for the connection. In some instances, the reroute function 300 may be invoked subsequently when query information becomes available, and the connection, if it exists, may then be rerouted to the database selected by invocation of the reroute function 300.

The reroute function 300 may examine the query information and/or the properties of the requested connection. The reroute function may, based on this information, return an identifier of a connection pool from which the connection requested by the client device should be drawn. This identifier may be returned as part of the output 304 of the reroute function 300. The output 304 of the reroute function 300 may be made available to a connection pool manager through a variety of means, such as by the return value of the reroute function 300, as an output parameter of the reroute function 300, through an application programming interface ("API") provided by a connection pool manager, and so forth.

The reroute function 300 may perform a variety of operations in addition to or instead of selecting a connection pool. For example, the reroute function 300 might monitor and collect various performance metrics related to operation of the connection pool manager, processing times of queries, and so forth. In one example, the reroute function 300 monitors processing times for a certain query and, if the processing time exceeds a threshold, begins to reroute connection requests related to the set query to an alternate pool of connections.

In some instances, rather than identify a connection pool from which the requested connection should be obtained, the reroute function 300 may identify a specific connection. For example, the reroute function 300 might determine that a given connection has recently processed a query for which a connection is presently being requested. The reroute function might therefore return the same connection. This might, for example, be done when the database associated with the connection is presumed to have maintained a cached result of the previously executed query and to be able to process the query efficiently as a result.

In an embodiment, the reroute function 300 comprises a routing table. The routing table may be stored in a file and supplied to a connection pool manager. A routing table might, for example, appear as follows:

[databases]
dev="host=serverDefault port=1234 dbname=dev"
dev1="host=server1 port=1234 dbname=dev"
dev2="host=server2 port=1234 dbname=dev"

Continuing this example, a reroute function might appear as:

def routing rules(username, query)
  if "TableA" in query:
    return dev1;
  else
    return dev2;

In some instances, the reroute function might be expressed using regular expressions or some other pattern matching syntax to express a mapping between queries and an appropriate database. In some instances, the connection pool manager may provide a query parsing API to facilitate other, possibly more advanced, scenarios.

Figure 4A:
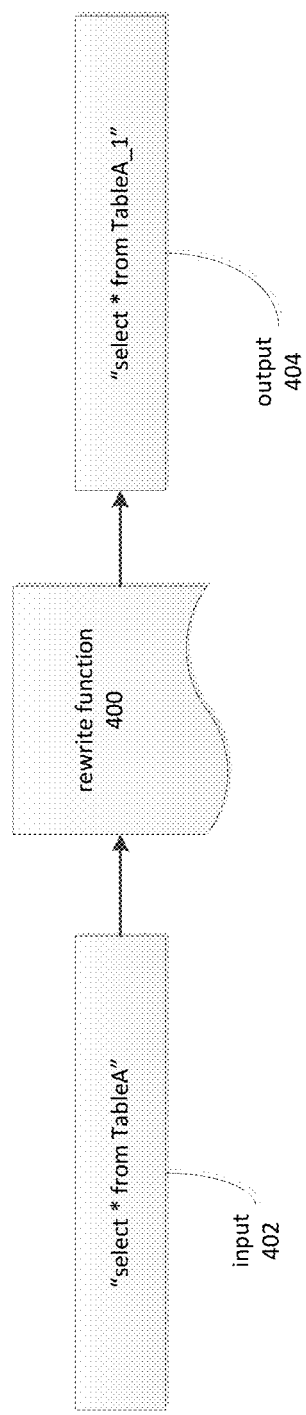
FIG. 4A is a block diagram depicting operation of a rewrite function.

FIG. 4A is a block diagram depicting operation of a rewrite function. Similarly to the reroute function 300 depicted by FIG. 3, the rewrite function 400 may process input 402 and provide output 404. The rewrite function 400 may be provided to a connection pool manager as source code or as compiled code, in a manner similar to that used with respect to the reroute function 300 depicted by FIG. 3. The input 402 and output 404 may be exchanged with a connection pool manager in a manner similar to the reroute function 300.

A connection pool manager may invoke the rewrite function 400 when a query is to be prepared or executed using a connection obtained by the pool. In some instances, the connection pool manager may process the command to perform the query by interposing a proxy connection between the client device and the database. In other instances, network communication between the client device and server may be inspected and processed by mechanisms other than a proxy, such as the installation of API hooks into a database API.

In some instances, the rewrite function 400 may be executed remotely from the connection pool manager. For example, the connection pool manager may provide the database with a copy of the rewrite function 400 for invocation on the server, prior to the query being processed.

The input 402 to the rewrite function may comprise the text of a query. For example, the text "select * from TableA"

might be provided to the rewrite function 400. The rewrite function 400 might parse the query text and form a rewritten query as "select * from TableA_1." The rewritten query may be provided as output 404. Using the output 404, the rewritten query may be substituted for the query submitted by the client device.

In an embodiment, the rewritten query is adapted to conform to the schema of the database selected by operation of the reroute function.

In an embodiment, the rewritten query is adapted to conform to a partitioning scheme, such that an input query of a table is rewritten as a query of multiple sub-tables, each sub-table corresponding to a partition of the table.

In an embodiment, the rewrite function may rewrite a query to take advantage of one or more of a pre-sorted table, pre-joined tables, and pre-aggregated tables.

In an embodiment, the rewrite function may adapt to or hide changes made to the schema of the database.

In an embodiment, the rewrite function may apply a security filter. For example, the rewrite queries that it determines to represent a security threat. For example, the rewrite function might identify queries comprising potential SQL-injection vulnerabilities, and rewrite the query to either correct the vulnerability or to substitute the risky query with a known "safe" query, such as a query that simply returns an error message.

In an embodiment, the rewrite function may rewrite the query to conform to a grammar supported by the target database. For example, the rewrite function might rewrite a query written to conform to a NoSQL syntax into a syntax compatible with SQL.

In an embodiment, insert or update statements may be rewritten to apply to an alternate table that has been optimized for write operations. For example, an insert statement might be rewritten to write to a temporary table that is used to hold the new rows until a batch insert operation may be performed on the original table.

In some embodiments, queries may be transmitted using a wire-level protocol that may divide communications into network packets too small to contain some queries. For example, some protocols for database communication have a default network packet size of 2 k, which may be too small for many queries. The connection pool manager may include a mechanism for pausing transmission of these packets to the server until all of the query is present and can be rewritten. In this manner, the query can be rewritten in full prior to being transmitted to the database. In other embodiments, queries larger than a single network packet may bypass the rewrite mechanism, or an error message may be generated without rewriting or processing the query.

FIG. 4B is a diagram depicting an example of a rewrite function. The example of FIG. 4B permits utilization of efficient structures based on the contents of a query. Using a rewrite function, the caller is able to take advantage of structures that may enhance query efficiency without having knowledge of the particular structures that are to be employed. Moreover, the client device is protected from potential future changes to these structures.

Figure 5:
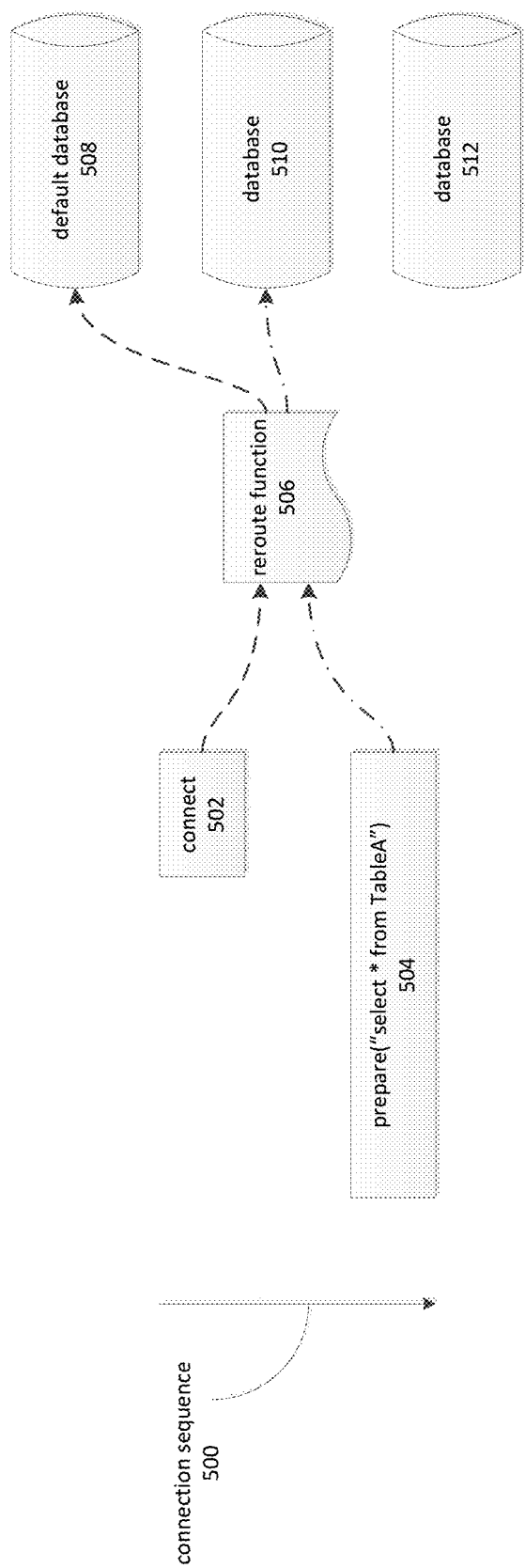
FIG. 5 is a block diagram depicting rerouting of a connection to a database.

FIG. 5 is a block diagram depicting rerouting of a connection to a database. In some instances, rerouting may occur during a connection sequence 500. The connection sequence 500 may involve a series of messages sent to a connection via a connection pool manager. In some cases, the messages may be directed to a connection but processed by the connection pool manager.

A first message may be a connect message 502 received by the connection pool manager. The connect message 502 indicates that the client device wished to obtain a connection. In some cases, the connect message is received by an API call. In other instances, the connection pool manager receives a connect message transmitted over a network. The message may be associated with a protocol such as though employed by open-database connectivity stacks, or other call-level interfaces.

The connection message 502 may be presented to the reroute function 506 as a parameter. The reroute function 506 may initially process the connection message 502 before information pertaining to a query is available. In FIG. 5, this is depicted by the connect message 502 being processed prior to the prepare message 504 in the connection sequence 500. In other words, the reroute function 506 may, in some cases, be invoked before a message such as the depicted prepare message 504 has been issued.

The reroute function 506 may be invoked by the connection pool manager in response to the receipt of the connect message. Since no query information is available, the reroute function 506 may indicate that a default database 508 should be connected to the client device. A connection to the default database 508 may then be given to the client device for use during the interim period between the receipt of the connect message 502 and the receipt of the prepare message 504, or some other message containing information indicative of a query that should be processed by a database server other than the default.

During such an interim period, the default database 508 may process requests or queries prior to the receipt of a query that is to be rerouted. For example, the default database 508 may process requests or queries that involve obtaining schema information.

The prepare message 504 may then be processed by the reroute function 506. The reroute function 506 may determine that the connection should be switched from the default database 508 to another database 510 prior to processing the prepare command. For example, the reroute function 506 might determine that the depicted "select * from TableA" query should be performed on a database 510 rather than the default database 508.

The connection pool manager may cause the connection to be switched by associating a proxy for the connection to a new connection to the database 510. The proxy may have originally been associated with a connection to the default database 508.

Note that the connection manager may, in some cases, obtain one of several possible connections to the new database 510 from a pool of connections to the same database. A similar approach may be used to obtain connections to the default database 508.

Figure 6:
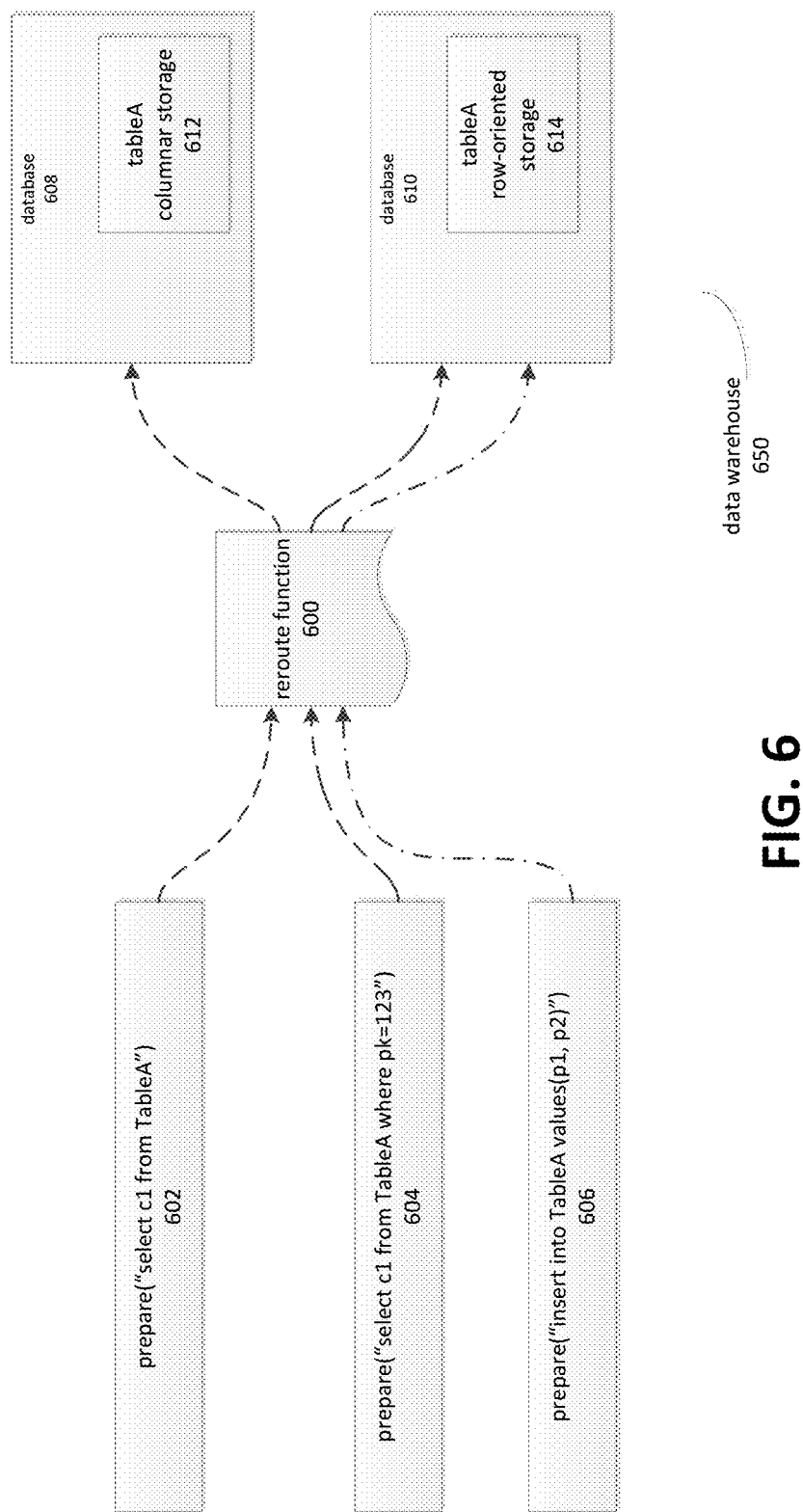
FIG. 6 is a block diagram depicting operation of a reroute function to select a storage structure.

FIG. 6 is a block diagram depicting operation of a reroute function to select a storage structure. A data warehouse 650 may comprise some number of databases 608, 610. The data warehouse 650 may maintain a number of versions of a table, depicted in FIG. 6 as "tableA." One of the databases 608 may contain a version of a table, depicted as "tableA," 612 that is stored using a column-centric storage format. As such, the database 608 may be most efficient when processing queries that are column-centric. For example, queries that aggregate column values or retrieve a large number of values for a small number of columns may be most efficiently processed on a database 608 that is using a column-centric storage format. A second database 610, on the other hand, might store a version of tableA, depicted as "tableA" 614 in FIG. 6, which uses a row-oriented storage format. A row-oriented storage format might be most efficient at processing requests to retrieve specific rows of data, or with operations that involve multiple columns over a constrained number of rows.

For example, a first query 602 might be "select c1 from TableA." Since this query specifies that the entirety of a single column should be retrieved from TableA, it may be more efficiently processed when the data is stored in column-centric fashion. The reroute function 600 might analyze the query, determine that it references a large of rows for a small number of columns, and then determines to return an identifier for a pool of connections to the database 608 that contains a columnar-storage structure 612 for tableA 612.

In another example, a second query 604 might be "select c1 from TableA where pk=123." In this case, since only a single row is being retrieved, it may be more efficient to utilize a row-oriented structure. The reroute function 600 may, in this case, return an identifier to a pool of connections to a database 610 using row-oriented storage for tableA 614.

In another example, a third query 606 might be "insert into TableA values(p1, p2)." Here, the query specifies an insert. Depending on various factors, this may be more efficiently performed using a version of tableA 614 that uses row-oriented storage. Accordingly, the reroute function 600 might return an identifier of a connection pool containing connections to the database 610 that contains a version of tableA 614 with row-oriented storage.

Figure 7:
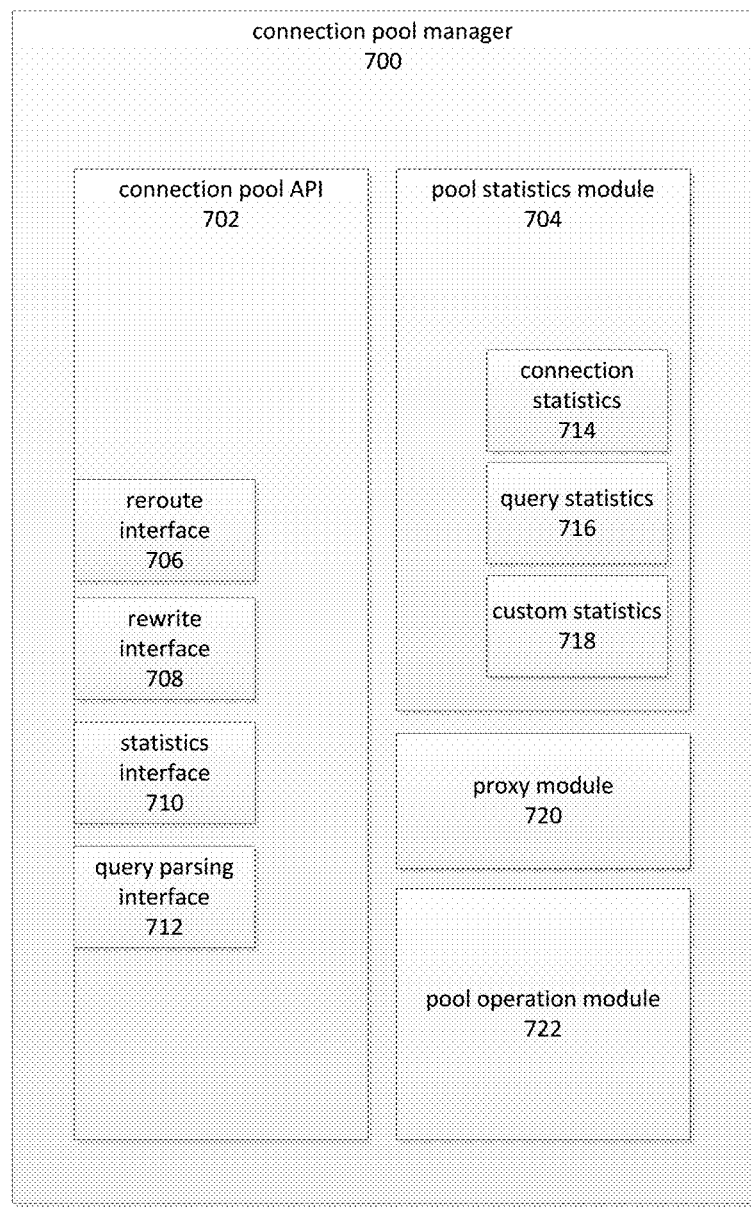
FIG. 7 is a block diagram depicting a connection pool manager.

FIG. 7 is a block diagram depicting a connection pool manager. A connection pool manager 700 may comprise various modules, including a pool operation module 722, a proxy module 720, a pool statistics module 704, and one or more modules for providing a connection pool API 702.

The pool operation module 722 may perform operations related to the operation of connection pools, including locating pools having a requested set of properties, creating new pools, adding connections to pools, removing connections from pools, and so forth. The proxy module 720 may perform operations related to receiving, processing, and retransmitting communications between a client device and a database. The proxy module 720 may act as a stand-in between a connection from the client device to the database. For example, the client device may be connected to the proxy but operate as if it had a direct connection to the database. The proxy module 720 may maintain a connection to the database that is paired with the client device's connection to the proxy. The proxy module 720 may also substitute the connection to the database with a different connection as needed. For example, the proxy might initially use a connection to a default database, and then substitute that connection with a connection to a different database specified by a reroute function. That connection might then be used to process database requests, even though nothing has changed from the client device's perspective.

The pool statistics module 704 may maintain various statistics about the operation of the pool and about the queries or other operations on the database that are performed on the connection. For example, a connection statistics module 714 may collect metrics pertaining to the operation of the database connections, such as free/busy ratios, lifetime, and so forth. The query statistics module 716 may collect information such as the length of time a query takes to complete, and so forth.

The custom statistics module 718 may maintain various metrics produced by operation of reroute and rewrite functions. For example, a reroute function might calculate statistics pertaining to how often connections are rerouted. A rewrite function might calculate statistics pertaining to which queries are most commonly executed on certain databases. The custom statistics module 718 may, in some instances, be utilized to store the statistics calculated by the reroute and rewrite functions.

The connection pool API 702 may provide interfaces for utilizing various features of the connection pool manager 700. For example, the reroute interface 706 may include functions for providing source code for a reroute function. The reroute interface 706 might also provide functions for enumerating or identifying connection pools, examining connection pool properties, and so forth. More generally, the reroute interface 706 may include functions used to cause the reroute function to be invoked, and that the reroute function may itself invoke during its operation. The rewrite interface 708 is similar, but pertains to rewrite functions. The query parsing interface 712 may be used by reroute and rewrite functions for assistance in identifying query attributes or properties. The statistics interface 710 may include interfaces for accessing the data maintained by the pool statistics module 704.

Figure 8:
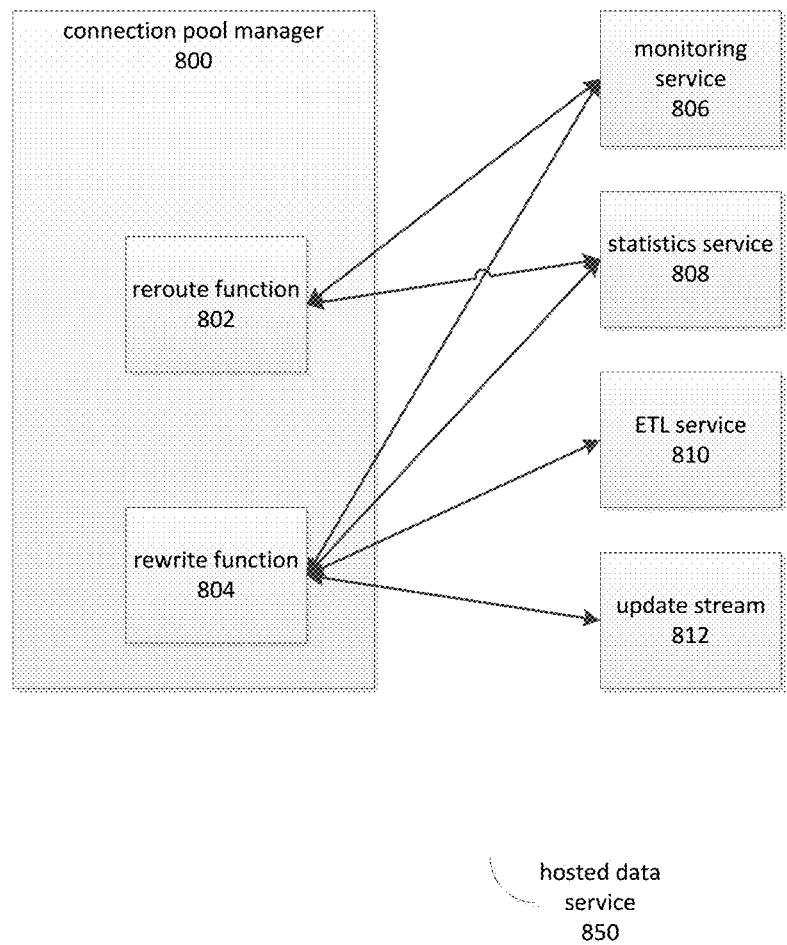
FIG. 8 is a block diagram depicting extensions of reroute and rewrite functions.

FIG. 8 is a block diagram depicting extensions of reroute and rewrite functions. A connection pool manager 800 may be used within a hosted data service 850. The connection pool manager 800 may, for example, be hosted on a computing node to which clients of the hosted data service 850 directly or indirectly connect to in order to access data services. The data services may, for example, comprise storage, retrieval, and/or analysis of data.

The connection pool manager 800 may invoke a reroute function 802 and a rewrite function 804. As described herein, the reroute function 802 and rewrite function 804 may be invoked to reroute database connection and rewrite queries. In various instances, additional or alternative operations may be performed by the reroute function 802 and rewrite function 804.

For example, the reroute functions 802 may interact with a monitoring service 806 and/or a statistics service 808. In an embodiment, the reroute function 802 may publish information indicative of connection-related events to a monitoring service 806. Examples include publishing information about connection statistics, reported errors, and so forth to the monitoring service 806. In another embodiment, the reroute function 802 may receive and process messages from the monitoring service. For example, the monitoring service may also include a control surface that allows for the status of a database to be modified. For example, a database might be designated as "going offline," after which the reroute function could prevent connections to that database from being formed.

The reroute function 802 may also, in some embodiments, publish statistics to a statistics service 808. The reroute function 802 might also, in some embodiments, receive statistics information from the statistics service 808 and take action based on the statistics. For example, the reroute function 804 might determine, based on the statistics, that a certain server should be taken offline, and thereafter prevent new connections to that database from being formed. The rewrite function 804 might interact with the monitoring service 806 and the statistics service 808 in a similar manner, e.g. by publishing data to the monitoring service 806 or responding to input provided from a control surface of the monitoring service 806.

The rewrite function 804 may, in some embodiments, interact with an extract-transform-load ("ETL") system. The rewrite function 804 might, in some cases, publish information concerning data values to the ETL system. The rewrite function 804 might, in some cases, receive transformation rules from the ETL system and rewrite queries based on the received transformation rules. In some instances, the transformation rules received from the ETL service 810 might be updated in an approximation of "real time," based on sources such as data published to the service by the rewrite function 804.

In some instances, the rewrite function 804 may publish data to an update stream 812. The rewrite function 804 may, in this instance, be used to identify queries that have been submitted and to broadcast information about the submitted query.

A connection pool manager may provide a variety of entry points for connection rerouting, query rewriting, monitoring, and other operations. Here, an entry point refers to when a function provided by an administrative client device or a user is invoked. The entry points may occur, for example, when a connection is requested, when a connection has been made, when a request to perform a query has been received, and when the request to perform the query has completed.

The various figures and description provided herein may generally refer to a connection pool manager being used to connect to databases. Note, however, that many of the techniques described herein may be applied to applications other than databases. In general, a connection pool manager may employ reroute and rewrite functions in support of client device interaction with a variety of applications. In particular, a connection pooler may be employed with applications that involve a connection or may be accessed by a proxy, and that processes some form of query.

Multiple instances of a connection pool manager may be employed. In some instances, a connection pool manager may be hosted on a computing node dedicated in whole or in part to performing the operations of the connection pool manager. In other instances, the connection pool manager may be operated on a client device. A connection pool manager may therefore receive communications from a client device either over a network or through a shared memory or other local communications mechanism on the client device.

As used herein, a module may refer to a processor and a memory a computing device. The memory may include, for example, random-access memory, read-only memory, solid-state memory, and so forth, excluding signals per se. The memory is transformed by the loading of computer-executable instructions that, when executed by the processor, perform the operations of the module as described. The computer-executable instructions for a module may occupy one or more portions of the memory, or be distributed across multiple memories. For example, a module may be partially loaded into random-access memory while also stored on a solid-state or mechanical disk storage. Portions of other modules may be intermingled in memory with other modules.

In some embodiments, a check module may be employed to validate the usage of rerouting and rewrite functions. For example, the check module may examine a database to which a connection has been rerouted or a query that has been rewritten to determine if the change might result in unexpected or undesired behavior. For example, the check module might determine that a connection should not be rerouted when a multi-statement transaction is in progress.

Figure 9:
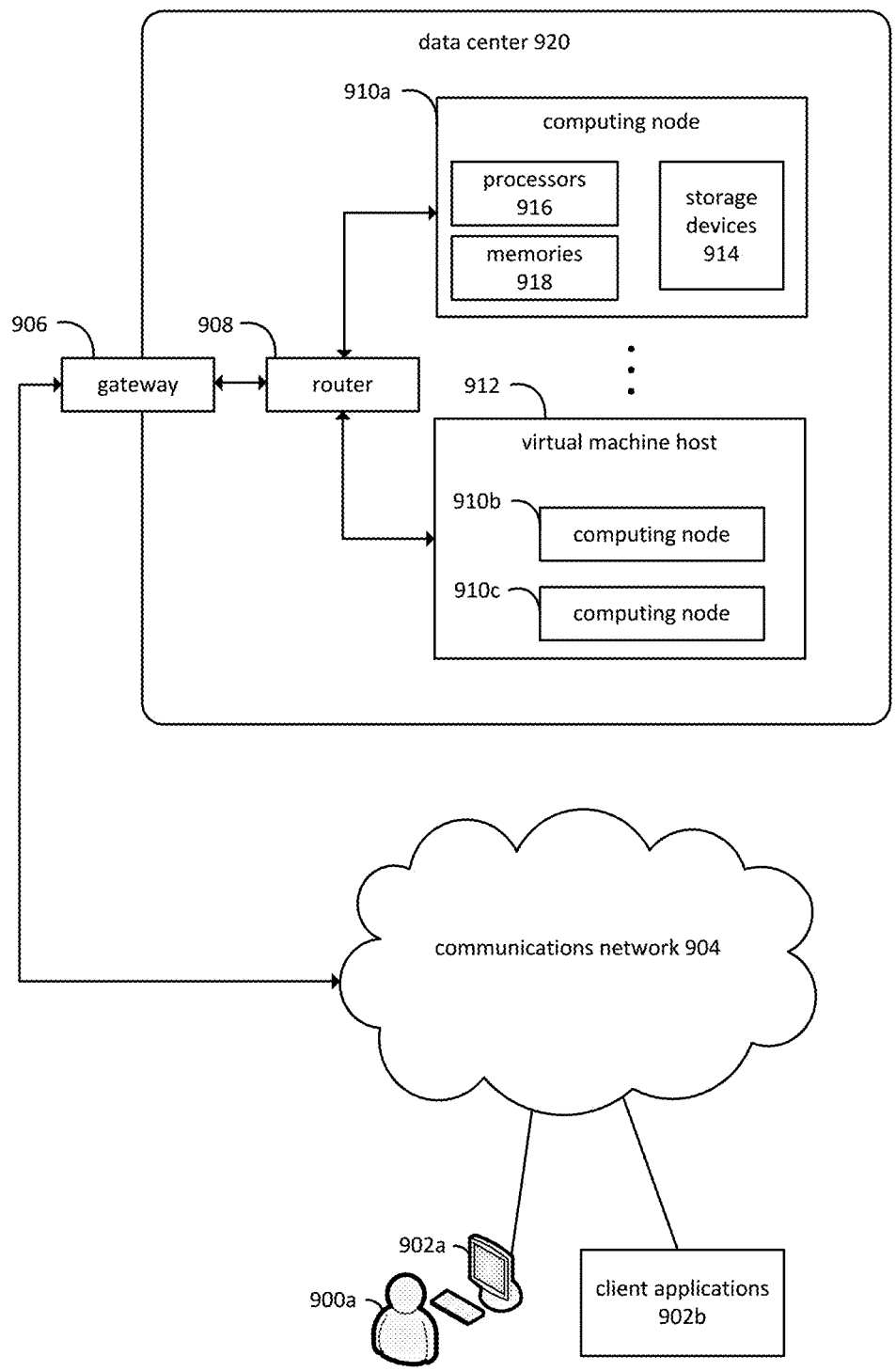
FIG. 9 is a block diagram depicting an embodiment of a computing environment in which aspects of the present disclosure may be practiced.

FIG. 9 is a diagram depicting an example of a distributed computing environment on which aspects of the present invention may be practiced. Various users 900*a* may interact with various client applications, operating on any type of computing device 902*a*, to communicate over communications network 904 with processes executing on various computing nodes 910*a*, 910*b*, and 910*c* within a data center 920. Alternatively, client applications 902*b* may communicate without user intervention. Communications network 904 may comprise any combination of communications technology, including the Internet, wired and wireless local area networks, fiber optic networks, satellite communications, and so forth. Any number of networking protocols may be employed.

Communication with processes executing on the computing nodes 910*a*, 910*b*, and 910*c*, operating within data center 920, may be provided via gateway 906 and router 908. Numerous other network configurations may also be employed. Although not explicitly depicted in FIG. 9, various authentication mechanisms, web service layers, business objects, or other intermediate layers may be provided to mediate communication with the processes executing on computing nodes 910*a*, 910*b*, and 910*c*. Some of these intermediate layers may themselves comprise processes executing on one or more of the computing nodes. Computing nodes 910*a*, 910*b*, and 910*c*, and processes executing thereon, may also communicate with each other via router 908. Alternatively, separate communication paths may be employed. In some embodiments, data center 920 may be configured to communicate with additional data centers, such that the computing nodes and processes executing thereon may communicate with computing nodes and processes operating within other data centers.

Computing node 910*a* is depicted as residing on physical hardware comprising one or more processors 916, one or more memories 918, and one or more storage devices 914. Processes on computing node 910*a* may execute in conjunction with an operating system or alternatively may execute as a bare-metal process that directly interacts with physical resources, such as processors 816, memories 918, or storage devices 914.

Computing nodes 910*b* and 910*c* are depicted as operating on virtual machine host 912, which may provide shared access to various physical resources, such as physical processors, memory, and storage devices. Any number of virtualization mechanisms might be employed to host the computing nodes.

The various computing nodes depicted in FIG. 9 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 10:
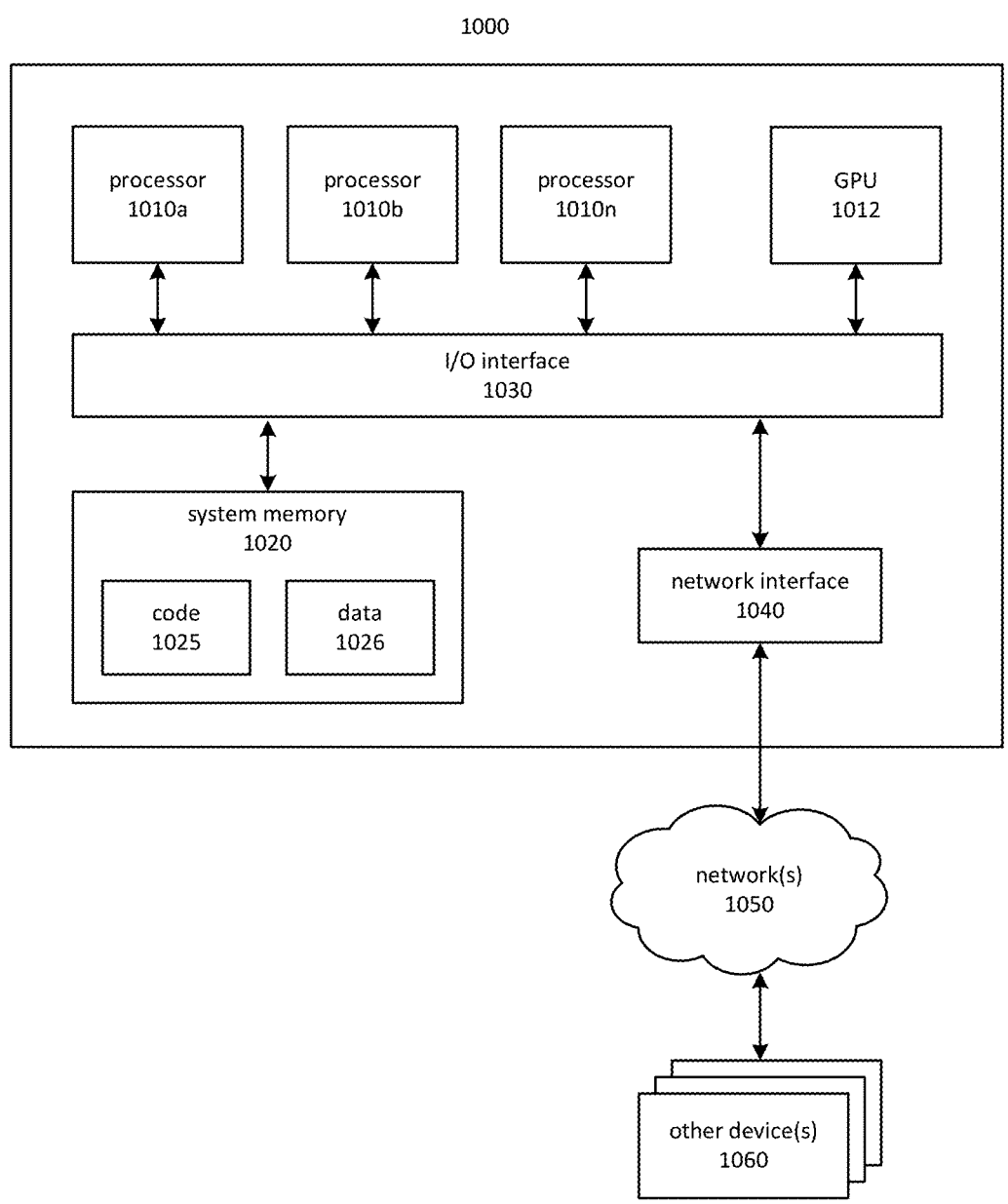
FIG. 10 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 10 depicts a general-purpose computer system that includes or is configured to access one or more computer-accessible media. In the illustrated embodiment, computing device 1000 includes one or more processors 1010a, 1010b, and/or 1010n (which may be referred herein singularly as a processor 1010 or in the plural as the processors 1010) coupled to a system memory 1020 via an input/output ("I/O") interface 1030. Computing device 1000 further includes a network interface 1040 coupled to I/O interface 1030.

In various embodiments, computing device 1000 may be a uniprocessor system including one processor 1010 or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures ("ISAs"), such as the x86, PowerPC, SPARC or MIPS ISAs, or any other suitable ISA. In multiprocessor systems, each of processors 1010 may commonly, but not necessarily, implement the same ISA.

In some embodiments, a graphics processing unit ("GPU") 1012 may participate in providing graphics rendering and/or physics processing capabilities. A GPU may, for example, comprise a highly parallelized processor architecture specialized for graphical computations. In some embodiments, processors 1010 and GPU 1012 may be implemented as one or more of the same type of device.

System memory 1020 may be configured to store instructions and data accessible by processor(s) 1010. In various embodiments, system memory 1020 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques, and data described above, are shown stored within system memory 1020 as code 1025 and data 1026.

In one embodiment, I/O interface 1030 may be configured to coordinate I/O traffic between processor 1010, system memory 1020, and any peripherals in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect ("PCI") bus standard or the Universal Serial Bus ("USB") standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computing device 1000 and other device or devices 1060 attached to a network or networks 1050, such as other computer systems or devices, for example. In various embodiments, network interface 1040 may support communication via any suitable wired or wireless general data networks, such as types of Ethernet networks, for example. Additionally, network interface 1040 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 1020 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 1000 via I/O interface 1030. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 1000 as system memory 1020 or another type of memory. Further, a computer-accessible medium may include transmission media or signals, such as electrical, electromagnetic or digital signals, conveyed via a communication medium, such as a network and/or a wireless link, such as those that may be implemented via network interface 1040. Portions or all of multiple computing devices, such as those illustrated in FIG. 10, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines ("JVMs"), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems ("OS") and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system, comprising:
   a first logical database comprising a first logical table;
   a second database comprising a second logical table; and
   a computing node, that includes at least one processor and at least one memory, that at least:
      receives, from a client device, one or more requests collectively indicative of connecting the client device to the first logical database and processing a first query on the first logical table;
      causes a connection to be made to the second database in place of a connection to the first logical database, in response to a determination to connect to the second database that is based at least in part on a first result of a first function, the first function comprising instructions for analyzing the first query;
      obtains a second query by applying a second function to the first query, wherein the second function comprises instructions for rewriting the first query, wherein rewriting the first query comprises adapting to a difference between the first and second logical tables;
      sends a request to process the second query to the second database; and
      sends results of processing the second query to the client device.

2. The system of claim 1, wherein the computing node at least:
   receives definitions of the first function and the second function from an administrative client device.

3. The system of claim 1, wherein the difference between the first logical table and the second table comprises at least one of a different column, different partitioning scheme, different dataset, different index structures, different query processing engine, or different storage structure.

4. The system of claim 1, wherein the computing node at least:
   maintains a first connection pool comprising connections to the first logical database;
   maintains a second connection pool comprising connections to the second database; and
   determines to connect the client device to a connection to the second database from the second connection pool, the determination based at least in part on output of the first function.

5. The system of claim 1, wherein the first function determines that the second database is preferable for processing the first query based at least in part on the analyzing of the first query.

6. A method, comprising:
   receiving one or more requests collectively indicative of connecting a client device to a first logical database and processing a query involving the first logical database;
   connecting the client device to a second database, in response to a determination to connect the client device to the second database instead of the first logical database, the determination based at least in part on a result of invoking a first function, the first function comprising executable instructions for analyzing the query;
   sending a request to process a version of the query to the second database; and
   sending results of processing the version of the query to the client device.

7. The method of claim 6, further comprising:
   forming the version of the query by applying a second function to the query, wherein the second function comprises executable instructions for rewriting the query.

8. The method of claim 7, wherein processing the version of the query comprises utilizing an index not present on the first logical database.

9. The method of claim 8, wherein executing the instructions for rewriting the query causes an optimization available on the second database to be used, wherein the optimization is unavailable on the first logical database.

10. The method of claim 6, further comprising:
    receiving a definition of the first function from an administrative client device.

11. The method of claim 6, further comprising:
    connecting the client device to a proxy for the first logical database and connecting the proxy to the second database.

12. The method of claim 6, wherein connecting to the second logical database instead of the first logical database comprises obtaining a connection to the second logical database from a pool of database connections identified based at least in part on the result of the first function.

13. The method of claim 6, wherein the first function determines that the second database is preferable for processing the query based at least in part on the analyzing of the query.

14. The method of claim 6, further comprising:
determining to connect to the second database instead of the first logical database based at least in part on executing the instructions for analyzing the query and determining, based at least in part on the analyzing, that the second database has greater ability to process the version of the query than the first logical database.

15. A non-transitory computer-readable storage medium having stored thereon instructions that, upon execution by one or more computing devices, cause the one or more computing devices at least to:
receive, from a client device, one or more requests collectively indicative of connecting the client device to a first logical database and processing a first query on the first logical database;
connect the client device to a second database, in response to a determination to connect the client device to the second database instead of the first logical database, the determination based at least in part on a result of a first function, the first function comprising executable instructions for analyzing the first query;
send a request to process a second query based on the first query to the second database; and
send results of processing the second query to the client device.

16. The non-transitory computer-readable storage medium of claim 15, comprising further instructions that, upon execution by the one or more computing devices, cause the one or more computing devices to at least:
form the second query by applying a second function to the first query, wherein the second function comprises executable instructions for rewriting the first query to adapt to a difference between the first logical database and the second database.

17. The non-transitory computer-readable storage medium of claim 15, wherein the first function returns an identifier corresponding to a plurality of connections to the second database.

18. The non-transitory computer-readable storage medium of claim 15, wherein the one or more requests comprise a first request to connect to the first logical database and a second request to connect to the second database, the first request sent separately from the second request.

19. The non-transitory computer-readable storage medium of claim 15, wherein the first logical database corresponds to an operative database.

20. The non-transitory computer-readable storage medium of claim 15, comprising further instructions that, upon execution by the one or more computing devices, cause the one or more computing devices to at least:
determine to connect to the second database instead of the first logical database based at least in part on executing the instructions for analyzing the first query and determining, based at least in part on the analyzing, that capacity of the second database to process the second query is greater than capacity of the first logical database to process the first query.

* * * * *